UNITED STATES PATENT OFFICE.

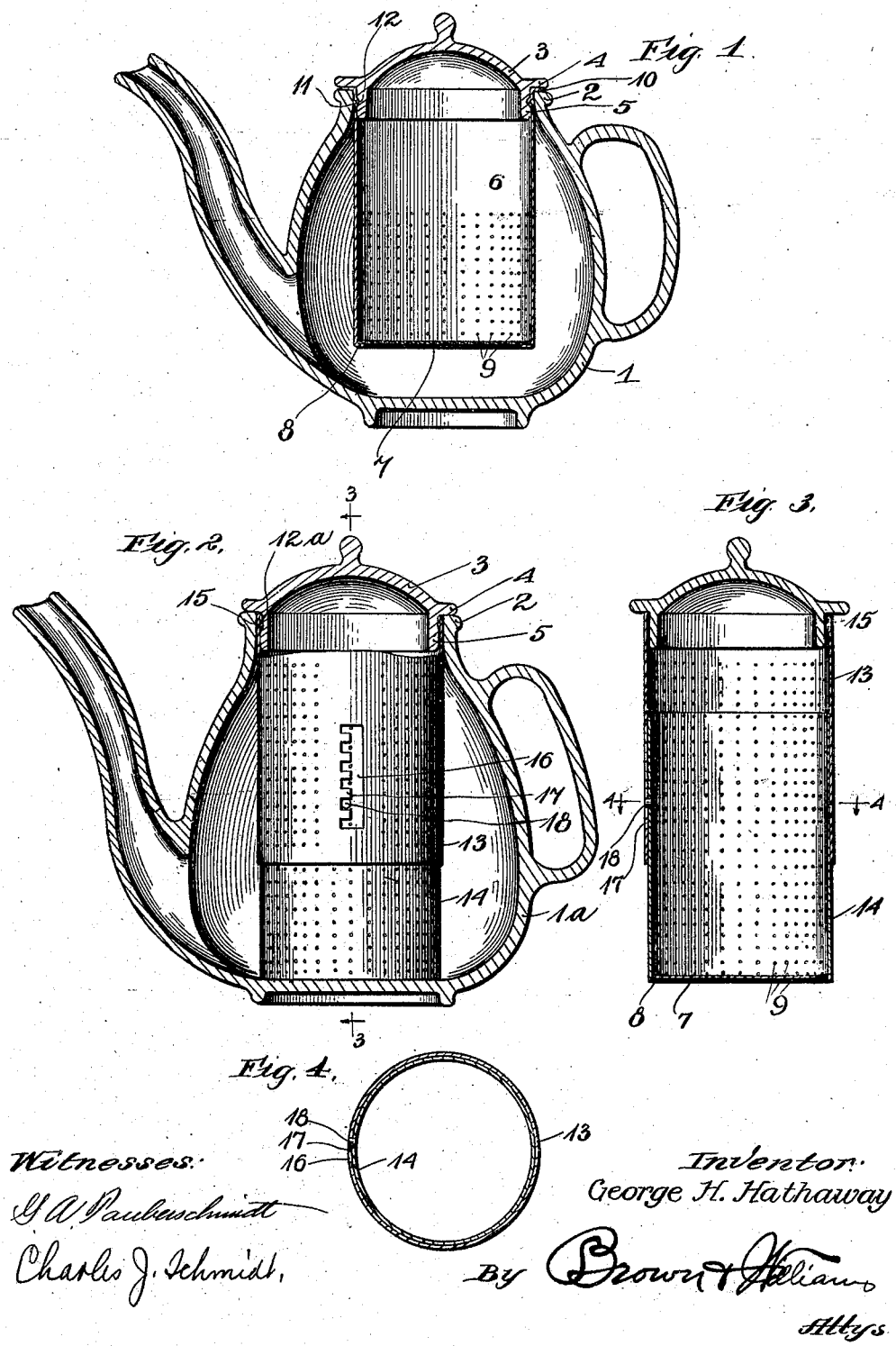

GEORGE H. HATHAWAY, OF CHICAGO, ILLINOIS.

FILTERING MECHANISM.

No. 918,674.  Specification of Letters Patent.  Patented April 20, 1909.

Application filed March 16, 1908. Serial No. 421,476.

*To all whom it may concern:*

Be it known that I, GEORGE H. HATHAWAY, a citizen of the United States, residing at Chicago, in the county of Cook and State of Illinois, have invented a certain new and useful Improvement in Filtering Mechanism, (Case 2,) of which the following is a full, clear, concise, and exact description, reference being had to the accompanying drawings, forming a part of this specification.

My invention relates to tea filter mechanism, its object being to provide a filtering device which can readily be inserted in the pots and which can easily and readily be withdrawn.

My invention is particularly useful in connection with individual tea pots, although it is equally adaptable to larger size tea pots and can also be used in coffee pots.

The filtering device is in the form of a cylindrical metallic cup having suitable perforations through which the water can pass after having been poured over the tea or coffee placed within the cup. The filter cup extends well down into the pot, so that the tea therein will be in intimate contact with the water in the pot, and after the liquid tea is of sufficient strength the cup can readily be withdrawn. The cup can also be adjustable to fit different sizes of pots, and provision may also be made so that the cover of the pot will serve as a means for lifting and removing the cup from the pot.

My invention is described on the accompanying drawings, in which—

Figure 1 is a diametral sectional view through a tea pot and a filter cup suspended therein; Fig. 2 is a like sectional view, an adjustable filter cup being shown which is shown part in full and part in section; Fig. 3 is a diametral sectional view through the adjustable cup, taken on line 3, 3 of Fig. 2; Fig. 4 is a sectional view taken on line 4, 4, of Fig. 3.

1 represents a tea pot, which may be of any shape, and which has the upper rim or flange 2 and is provided with a cover 3 having a horizontal flange 4 and a vertical flange 5, which vertical flange enters the pot when the cover is in position thereon.

The filter device shown in Fig. 1 is in the form of a cylindrical cup 6, made of any sheet metal, preferably of aluminum. The bottom 7 of the cup may be formed integral with the cylindrical walls of the cup, which may be drawn, stamped or otherwise formed, from a single piece of sheet material. This bottom may also be a separate piece, as shown, to rest against the inturned flange 8, to which it may be soldered, riveted, or otherwise secured, or upon which it may rest loosely so that it can be withdrawn to facilitate cleaning. The cylindrical wall of the cup may be provided with suitable perforations 9, in whole or in part, and the bottom 7 may or may not be perforated. At the upper edge of the cup is the horizontal flange 10, by means of which the cup is suspended in the tea pot, this flange engaging the flange 2 of the pot and is engaged by the flange 4 of the cover, the cover flange 5 extending into the cup.

When tea, for instance, is to be prepared, the leaves are placed in the filter cup, which is hung in the pot, whereupon water is then poured into the cup over the tea leaves, the liquid tea flowing through the perforations 9 into the pot. The cover is then placed on the pot, and after the cup with the tea therein has been immersed a sufficient length of time in the water in the pot, to give the desired strength to the tea, the cup is withdrawn. In order that the cup may be readily and safely withdrawn, I provide means for causing the cup to be clamped to the cover when it is placed in the pot, so that when the cover is withdrawn the cup will be lifted therewith from the pot. This means comprises a bead or inward projections 11 near the upper edge of the cup and a groove 12 in the outer face of the cover flange 5. When the cup has been suspended in the pot and the cover applied, the flange 5 may enter the mouth of the cup, as the metal of the cup is more or less springy, and the bead or projections 11 will enter the groove 12 when the cover is in final position to close the pot. Now, when the cover is raised, the cup which is clamped thereon can be lifted from the pot without danger of burning the hand, as might be the case if it were necessary to remove the cup by direct contact therewith. After the cup has thus been withdrawn from the pot, the cover can easily be removed therefrom. Thus, when the filter is in service, it is entirely closed except for the perforations 9 and the liquid tea will be entirely clear. The water in the pot has complete access to all the tea leaves, just as though these tea leaves were poured directly into the pot, and as before mentioned the cup can be retained in the pot until the tea has become of sufficient strength.

As there are a great number of different sized pots on the market, it becomes necessary to have the filter device adjustable to adapt itself to these different pots, and it may therefore be constructed as shown in Figs. 2, 3 and 4. The adjustable device comprises the telescoping outer and inner sections 13 and 14. The inner section 14 is in the form of a cylindrical cup which may be like that shown in Fig. 1, except that the upper flange is omitted. The outer member 13 telescopes over the inner member 14, and has its top edge section turned inwardly and downwardly, as shown, to form an inner annular bead 15. In the side of member 13, I provide a vertical slot 16, from whose one edge extend the teeth 17, while from the side of the inner member 14 there extends a pin 18, which pin when the members are together will engage in the slot 16, and upon turning of the member 14 may be moved between any two of the teeth 17. With this arrangement, the length of the filter device can be adjusted to the height of different pots and the parts held in their adjusted position. The diameter of the upper member can be made sufficiently small so that the device can be used in pots having very small diameters. The adjusted length will always be such that the top of the device will engage in the neck of the pot, to thus always fully expose its inlet. The cover of the pot may engage either at the outside or inside of the filter device. As shown in the figures, the device is adjusted to fit a pot 1ª, its upper end fitting the neck of the pot and its length being adjusted so that its upper edge will be as closely as possible level with the flange 2 of the pot. The flange 5 of the cover has the groove 12ª in its outer surface directly below the flange 4, so that when the cover is applied, the bead 15 will slip over the flange and into the groove, so that the filter device can be readily withdrawn after the tea has become of sufficient strength. The height of the inner member 14 and the position of the slot 16 are such that the slot 16 will always be closed by the inner member 14 if the filter device is used in pots within a range of size for which the device is made adjustable, and thus there can be no escape of tea leaves through the slot 16, the filter device being entirely inclosed with the exception of the perforation openings. The inner member 14 may be perforated in part or in whole, and the outer member 13 may also be perforated in part or in whole, as desired. The upper edge of the outer member 13 could also be provided with a horizontal outer flange, like that shown in Fig. 1, so that the device could be suspended from the entrance edge of the pot as in Fig. 1. The devices could also be formed of wire gauze instead of perforated sheet metal.

Many other forms and arrangements are possible which would all come within the scope of my invention, whose main purpose is to provide a filtering device which can be suspended within the pot to any depth, and which is entirely inclosed except for very small openings or perforations, and which can quickly and safely be withdrawn from the pot; also a device which is very sanitary.

Having thus described my invention, I desire to secure the following claim by Letters Patent:

In combination, a tea, coffee or similar pot, a filter in the form of a cup within said pot, a flange at the upper edge of said filter extending over and engaging with the entrance edge of the pot to thereby suspend the filter in the pot, a cover for the pot, said cover having a horizontal flange for engaging the flange of the filter and said cover also having a vertical flange for engaging with the mouth of the filter, a bead near the mouth of said filter, and a groove in said vertical flange for receiving the bead whereby the cover will be held to the filter thereby enabling the filter to be readily withdrawn from the pot upon raising of the cover.

In witness whereof, I hereunto subscribe my name this 14th day of March, A. D. 1908.

GEORGE H. HATHAWAY.

Witnesses:
CHARLES J. SCHMIDT,
HARVEY L. HANSON.